US010970988B2

(12) United States Patent
Otake

(10) Patent No.: US 10,970,988 B2
(45) Date of Patent: Apr. 6, 2021

(54) INFORMATION PROCESSING APPARATUS, INFORMATION PROCESSING SYSTEM, METHOD, AND PROGRAM

(71) Applicant: CANON KABUSHIKI KAISHA, Tokyo (JP)

(72) Inventor: Ritsuko Otake, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/829,971

(22) Filed: Mar. 25, 2020

(65) Prior Publication Data

US 2020/0312117 A1   Oct. 1, 2020

(30) Foreign Application Priority Data

Mar. 29, 2019 (JP) .............................. JP2019-067474
Dec. 19, 2019 (JP) .............................. JP2019-229715

(51) Int. Cl.
*G08B 21/18* (2006.01)
*G06T 7/70* (2017.01)
*G06K 9/00* (2006.01)
*H04N 7/18* (2006.01)

(52) U.S. Cl.
CPC ......... *G08B 21/18* (2013.01); *G06K 9/00362* (2013.01); *G06K 9/00771* (2013.01); *G06T 7/70* (2017.01); *H04N 7/18* (2013.01); *G06T 2207/30196* (2013.01)

(58) Field of Classification Search
CPC . G08B 21/18; G06T 7/70; G06T 2207/30196; G06K 9/00362; G06K 9/00771
USPC ...................................................... 340/573.4
See application file for complete search history.

(56) References Cited

U.S. PATENT DOCUMENTS

| 9,389,083 | B1* | 7/2016 | Agulnik | G06Q 50/01 |
| 10,614,689 | B2* | 4/2020 | Bess | G06N 20/00 |
| 2012/0268269 | A1* | 10/2012 | Doyle | G08B 21/0272 340/539.13 |
| 2019/0124475 | A1* | 4/2019 | Swart | H04W 4/029 |
| 2019/0340905 | A1* | 11/2019 | LeJeune, Jr. | G08B 21/0272 |

FOREIGN PATENT DOCUMENTS

| JP | 5343660 B2 | 11/2013 |
| JP | 2014-155159 A | 8/2014 |

* cited by examiner

*Primary Examiner* — John A Tweel, Jr.
(74) *Attorney, Agent, or Firm* — Canon U.S.A., Inc. IP Division

(57) ABSTRACT

In an apparatus configured to monitor a person in a predetermined area, location information indicating a location of the person and information indicating a destination of the person in the predetermined area are acquired for each of a plurality of persons present in the predetermined area. A contact between the persons is detected using the location information. Using the information indicating the destination of each of the persons detected as having contacted, it is determined whether the contact is an unauthorized contact, and a determination result is output.

17 Claims, 9 Drawing Sheets

FIG. 2

| ID 311 | EXAMINEE'S NUMBER 312 | NAME 313 | RECEPTION PHOTOGRAPH 314 | RECEPTION DATE/TIME 315 | EXAMINATION SITE 316 | EXAMINATION TIME INFORMATION 317 | APPROACHING PERSON INFORMATION 318 | UNAUTHORIZED CONTACT FLAG 319 |
|---|---|---|---|---|---|---|---|---|
| 0001 | A-859458 | ICHIRO TANAKA | IMG2000.jpg | 2017/12/01 07:43 | C | 08:30-08:50 | — | 0 |
| 0002 | A-349823 | JIRO SATO | IMG2001.jpg | 2017/12/01 07:51 | D | 08:45-09:05 | — | 1 |
| 0003 | B-456821 | SABURO TAKAHASHI | IMG2002.jpg | 2017/12/01 07:52 | A | 08:15-08:40 | — | 0 |
| . | . | . | . | . | . | . | . | . |

310

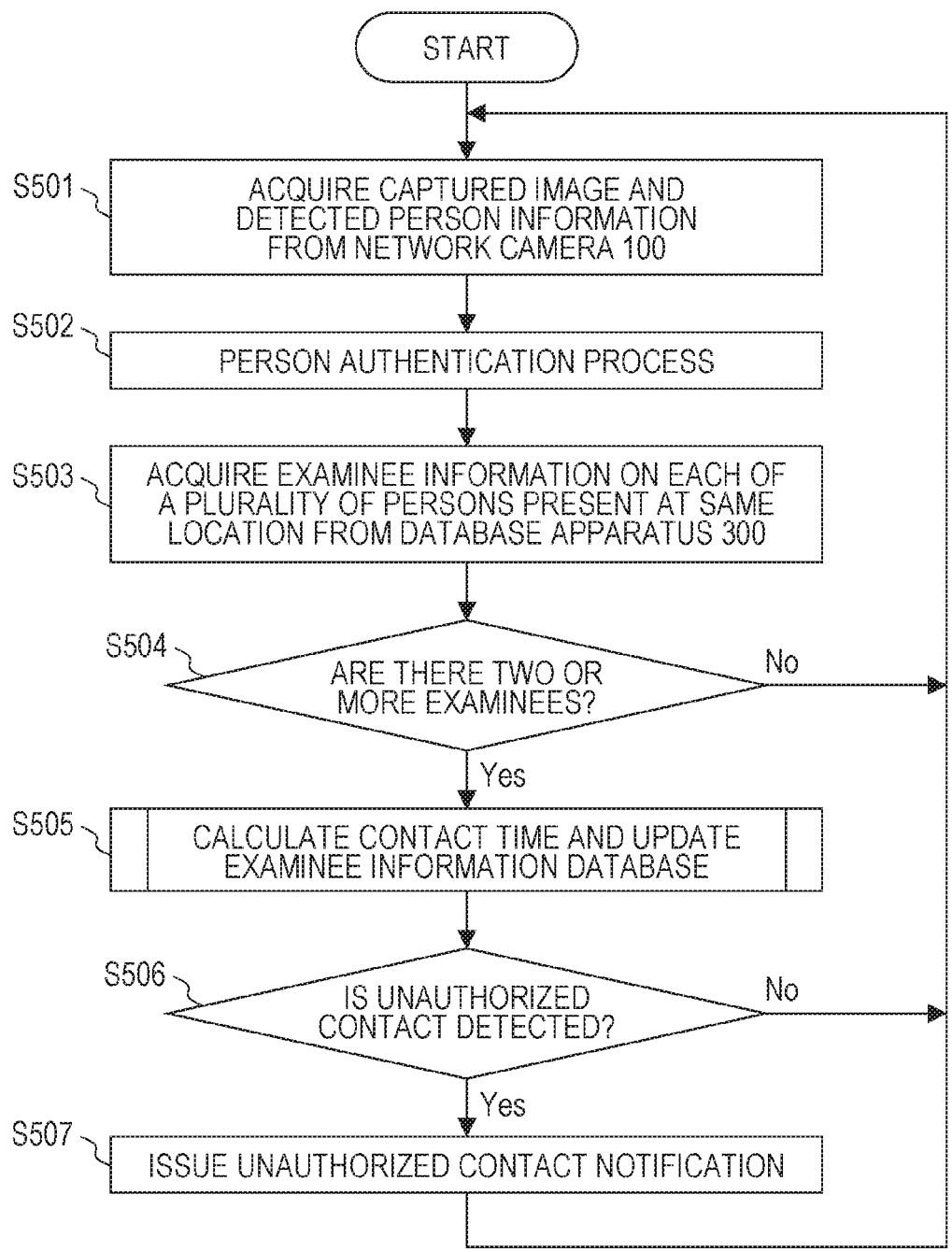

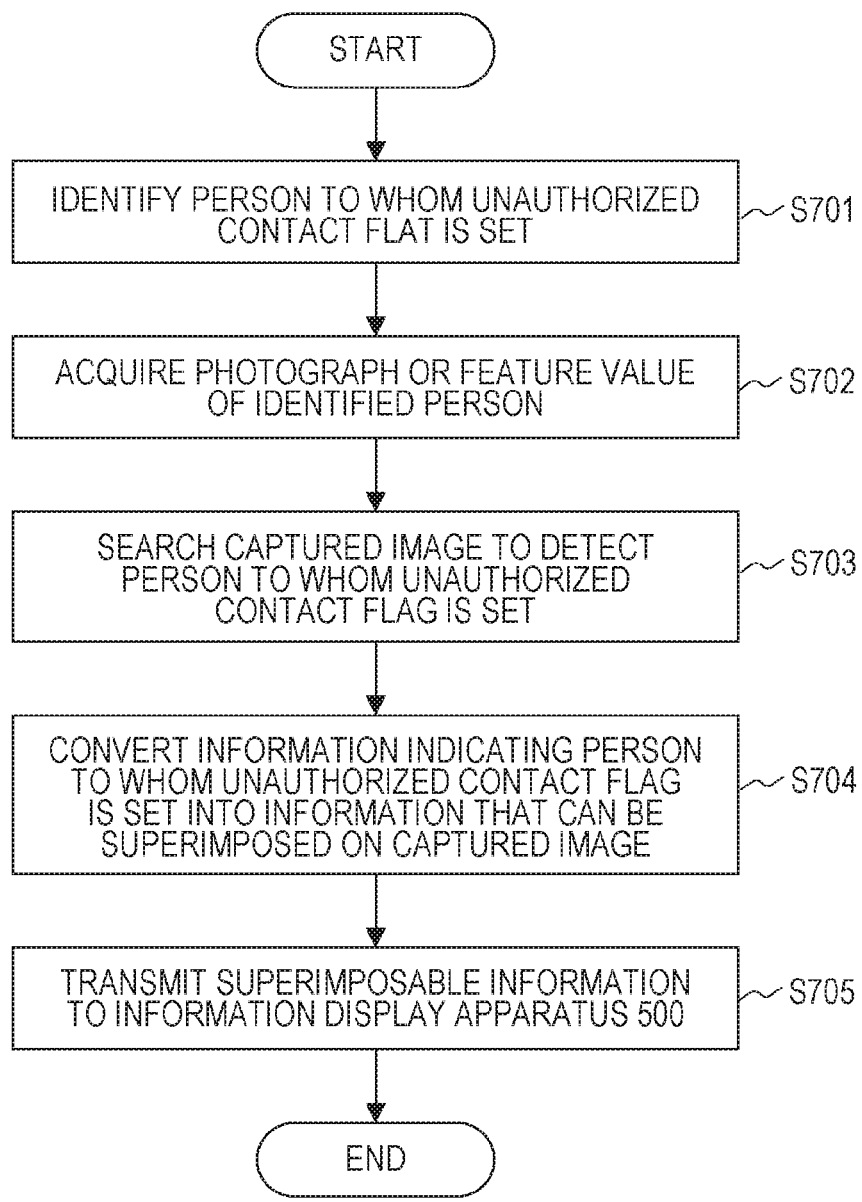

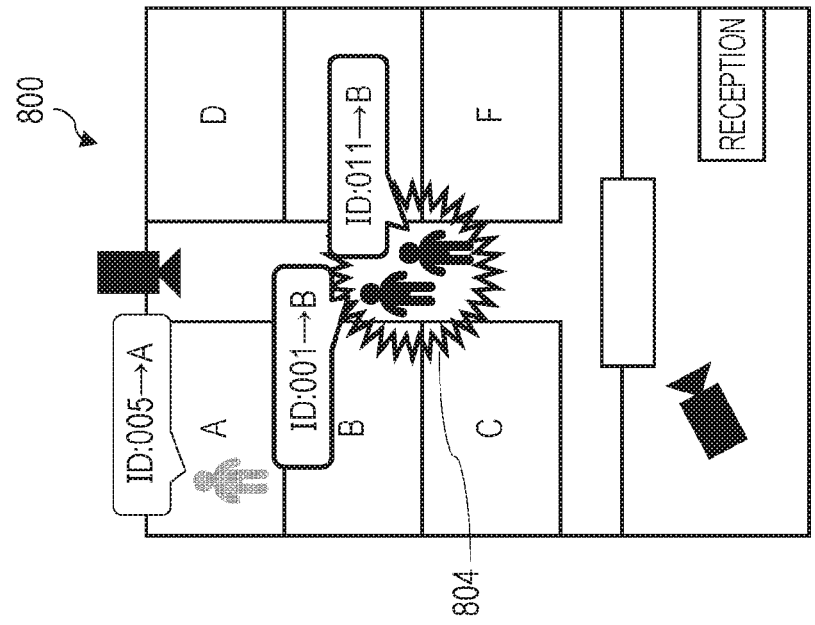
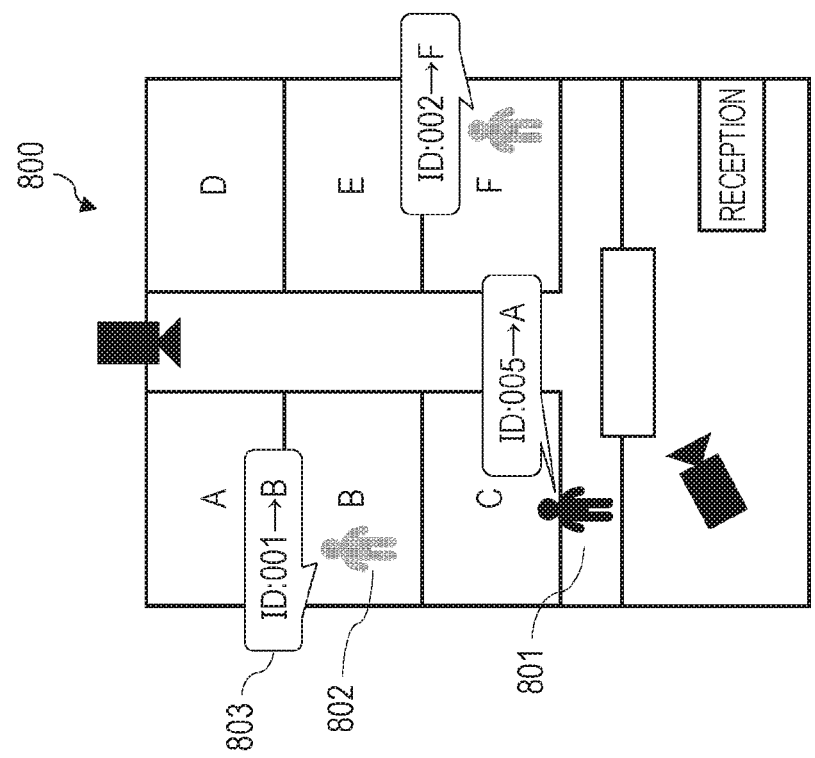

FIG. 9

| ID 321 | VISITING PERSON 322 | VISITOR'S NAME 323 | RECEPTION IMAGE 324 | RECEPTION DATE/TIME 325 | MEETING TIME 326 | COMPANION ID 327 | APPROACHING PERSON INFORMATION 328 | UNAUTHORIZED CONTACT FLAG 329 |
|---|---|---|---|---|---|---|---|---|
| 0001 | TARO SUZUKI | ICHIRO TANAKA | IMG2000.jpg | 2017/12/01 07:43 | 08:30-10:00 | 0002, 0004 | — | 0 |
| 0002 | TARO SUZUKI | JIRO SATO | IMG2001.jpg | 2017/12/01 07:44 | 08:30-10:00 | 0001, 0004 | — | 0 |
| 0003 | HANAMI YAMADA | SHIRO YAMADA | IMG2002.jpg | 2017/12/01 07:48 | 08:00-09:30 | — | — | 0 |
| 0004 | TARO SUZUKI | SABURO TAKAHASHI | IMG2003.jpg | 2017/12/01 08:02 | 08:30-10:00 | 0001, 0002 | — | 0 |
| . | . | . | . | . | . | . | . | . |

320

INFORMATION PROCESSING APPARATUS, INFORMATION PROCESSING SYSTEM, METHOD, AND PROGRAM

BACKGROUND OF THE INVENTION

Field of the Invention

The aspect of the embodiments relates to an information processing apparatus, an information processing system, a method, and a program.

Description of the Related Art

A system for determining whether a visitor who has visited a research facility or a company has visited a planned destination has been proposed (Japanese Patent No. 5343660).

A technique has been proposed for estimating a possibility of a contact between two persons from a monitoring image (Japanese Patent Laid-Open No. 2014-155159).

However, no technique has been proposed so far for monitoring whether persons having different destinations have an improper contact to give/receive information.

SUMMARY OF THE INVENTION

An apparatus configured to monitor a person in a predetermined area, includes an acquisition unit configured to acquire information indicating a location of the person and information indicating a destination of the person in the predetermined area, the acquisition being performed for each of a plurality of persons present in the predetermined area, a determination unit configured to determine whether a contact between persons having different destinations has occurred based on the acquired information, and an output unit configured to, in a case where the contact has occurred, output information identifiably indicating the occurrence of the contact.

Further features of the disclosure will become apparent from the following description of exemplary embodiments with reference to the attached drawings.

BRIEF DESCRIPTION OF THE DRAWINGS

FIG. 2 is a diagram showing an example of an examinee information database in a database apparatus according to an embodiment of the disclosure.

FIG. 5 is a flowchart illustrating an example of a process executed by an information processing apparatus in a monitoring system according to an embodiment of the disclosure.

FIG. 7 is a flowchart illustrating an example of a process executed by an information processing apparatus in a monitoring system to display information about a person who has had an unauthorized contact on an information display apparatus according to an embodiment of the disclosure.

FIGS. 8A and 8B are diagrams each illustrating an example of a screen displayed on an information display apparatus according to an embodiment of the disclosure.

FIG. 9 is a diagram illustrating an example of a visitor information database in a database apparatus according to an embodiment of the disclosure.

DESCRIPTION OF THE EMBODIMENTS

Embodiments of the disclosure are described below with reference to the drawings. Note that configurations shown in the following embodiments are given only by way of example and not for limiting the scope of the disclosure.

First Embodiment

Figure 1:
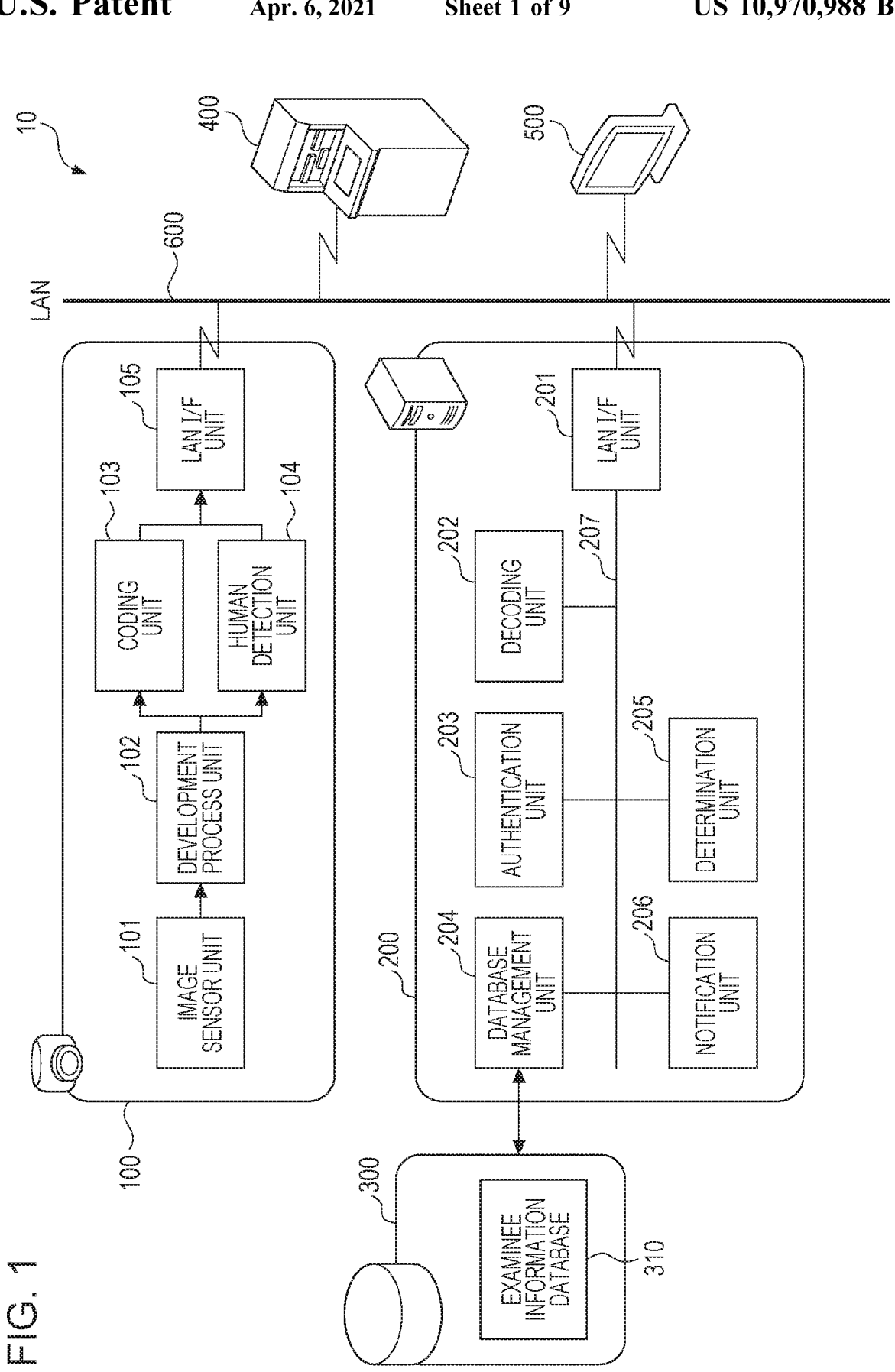
FIG. 1 is a diagram showing an example of a configuration of a monitoring system according to an embodiment of the disclosure.

FIG. 1 is a diagram illustrating an example of configuration of a monitoring system 10 (an information processing system) according to an embodiment of the disclosure. In an embodiment of the disclosure, by way of example, an examination site is monitored by the monitoring system 10. The monitoring system 10 includes a network camera 100, an information processing apparatus 200, a database apparatus 300, a reception terminal 400, and an information display apparatus 500, which are interconnected via a LAN 600 serving as a network line. The components of the monitoring system 10 illustrated in FIG. 1 are merely examples, and the monitoring system 10 may include another additional component. Each of these components will be described below.

The network camera 100 includes an image sensor unit 101, a development process unit 102, a coding unit 103, a person detection process unit 104, and a LAN interface (I/F) unit 105. The image sensor unit 101 includes an image sensor device, such as a CMOS image sensor, configured to photoelectrically convert an optical image formed on an imaging surface into an analog image signal and output the resultant analog image signal, and also includes an A/D converter configured to convert the analog image signal into a digital image signal. The development process unit 102 performs a predetermined development process on the digital image signal output from the image sensor unit 101. The development process may include, for example, processing such as debayer processing, white balance processing, gradation conversion processing, edge enhancement correction processing, defect correction processing, noise removal processing, enlargement/reduction processing, and color conversion to a YCbCr format.

The coding unit 103 compression-codes the digital image signal output from the development process unit 102 thereby generating image data to be provided via transmission to the information processing apparatus 200. The generated image data includes identification information (camera ID) of the network camera 100, information on the installation location (location information), shooting time information, and the like. The coding unit 103 also sets a frame rate when generating the image data. The image compression method used for generating image data to be transmitted may be a method based on, for example, H.264, H.265, MPEG, JPEG, or the like. The coding unit 103 may generate image data in an arbitrary format such as mp4, avi, or the like.

The person detection process unit 104 analyzes the digital image output from the development process unit 102 and detects information on a person included in the digital image. The person information to be detected includes image data of, for example, a face, an upper body, a lower body, a whole body, and a rear view. The image data may be image data obtained by extracting an area including the person from a captured image. In a case where an area is extracted, coordinate information of the area in the captured image is attached to the image data. The person information may be a feature value obtained from the image via a predetermined operation instead of the image data itself, or may include both the image data and the feature value. When the person information includes image data, the image data is subjected to a compression-coding process in the same manner as performed by the coding unit 103. For example, in the case of a still image, the image data may include JPEG image data. The detected person information and the associated coordinate information in the captured image are provided to the information processing apparatus 200 together with the camera ID, the location information, the shooting time information, and the like of the network camera 100 that has captured the image of the person. The information generated in the above-described manner is referred to as "detected person information".

The person detection process unit 104 may be disposed in the network camera 100 or may be disposed in an external apparatus such as the information processing apparatus 200. In the latter case, part or all of the functions executed by the person detection process unit 104 may be executed by the information processing apparatus 200, and the remaining functions may be executed by the network camera 100.

The LAN I/F unit 105 is a communication interface for transmitting the image data output from the coding unit 103 and the detected person information generated by the person detection process unit 104 to the information processing apparatus 200 via the LAN 600. The LAN I/F unit 105 adjusts data communication with a communication partner using, for example, a network file system such as NFS or CIFS, or a network communication protocol such as UDP or TCP.

Next, details of the information processing apparatus 200 are described below. The information processing apparatus 200 includes a LAN interface (I/F) unit 201, a decoding unit 202, an authentication unit 203, a database management unit 204, a determination unit 205, and a notification unit (output unit) 206, and these may be connected to each other via a system bus 207.

The LAN I/F unit 201 communicates with the network camera 100, the information display apparatus 500, and the like via the LAN 600.

The decoding unit 202 decompression-decodes image data included in the detected person information acquired from the network camera 100 via the LAN 600 thereby obtaining the original digital image signal. The decoded digital image signal is output to the authentication unit 203. In a case where the information processing apparatus 200 includes the person detection process unit 104, the person detection process unit 104 may be connected to the system bus 207. The person detection process unit 104 detects information about a person from the image data decoded by the decoding unit 202, and provides the detected person information to the authentication unit 203.

The authentication unit 203 performs an authentication process to identify a person in the captured image based on the detected person information generated by the person detection process unit 104 and a reception image 314 registered in an examinee information database 310 which will be described later. Details of this authentication process will be described later.

The database management unit 204 manages registration information recorded in the database stored in the database apparatus 300. For example, the database management unit 204 updates the registration information recorded in the examinee information database 310, extracts registration information from the database, and provides the extracted information to a processing unit as needed.

The determination unit 205 performs a process to make the determination as to an unauthorized contact of a person in a particular area based on the registration information described in databases stored in the database apparatus 300. In the disclosure, "contact" is not limited to physical contacts between persons, but when a difference in location coordinates between persons is within a predetermined threshold value (a predetermined range), the persons are regarded as being in contact. Also note that, in the disclosure, "unauthorized contact" means an unallowable contact between persons.

The notification unit 206 sends (outputs) information on a person who had an unauthorized contact to the information display apparatus 500 based on the determination result provided by the authentication unit 203 and the determination unit 205. Details of the notification information will be described later with reference to FIG. 7 and FIGS. 8A and 8B.

The database apparatus 300 is a database in which information is registered which is to be referred to when the information processing apparatus 200 executes a process according to the present embodiment, and may include an examinee information database 310 and the like. In the configuration described above, the database apparatus 300 is connected to the information processing apparatus 200, but alternatively the database apparatus 300 may have a network interface and may be connected to the LAN 600. In this case, communication between the information processing apparatus 200 and the database apparatus 300 is performed via the LAN I/F unit 201.

The examinee information database 310 is a database in which information on each examinee who has visited a facility being monitored by the monitoring system 10 is registered. Details of this database will be described later with reference to FIG. 2.

The reception terminal 400 is a terminal apparatus used by an examinee in performing a reception procedure when the examinee arrives at a facility to be monitored by the monitoring system 10. The examinee shows the examinee number in accordance with an instruction given by the reception terminal 400, and the reception terminal 400 takes a photograph of the examinee for identification, and generates photographed image data (also referred to as captured image data or simply an image or a reception image).

If the examinee number is correct and taking of the photograph is performed correctly, a reception procedure for the examinee to enter the facility is completed.

When the reception procedure is completed, the reception terminal 400 transmits examinee information to the information processing apparatus 200 together with the captured image data. The examinee information may include, for example, the name of the person registered in advance, the examination site, and the examination start/end time identified based on the examinee number. The examination site is identifiable information indicating a destination of the examinee (destination information). In the present embodiment, the information indicates, by way of example, the examination site. However, in alternative embodiments, information may include information indicating entry allowance and an affiliation set for each person.

The information display apparatus 500 is an apparatus that displays information transmitted from the information processing apparatus 200. The information display apparatus 500 may be realized by, for example, a personal computer (PC), a tablet terminal, a smartphone terminal, or the like. The information display apparatus 500 may be connected to the LAN 600 either by wire or wirelessly. For example, the wireless communication may be achieved according to, for example, the IEEE 802.11 wireless LAN standards.

In the embodiment described below, the information display apparatus 500 is a personal computer used as a display apparatus by a security guard, who guards the inside of the facility in which the monitoring system 10 is installed, in checking a notification sent from the information processing apparatus 200.

In the configuration of the monitoring system 10 shown in FIG. 1, the number of network cameras 100 may be one or more. Note that there is no limitation on the number of network cameras 100. The information processing apparatus 200, the database apparatus 300, and the information display apparatus 500 each may be realized not only by a single apparatus, but also a plurality of apparatuses operating in cooperation so as to realize functions.

Next, a data structure of a database in the database apparatus 300 is described with reference to FIG. 2.

In the examinee information database 310, examinee information that has been accepted by the accepting terminal 400 is registered. More specifically, the examinee information includes information in terms of an ID 311, an examinee number 312, a name 313, a reception image 314, a reception date/time 315, an examination site 316, examination time information 317, approaching person information 318, and an unauthorized contact flag 319.

In the ID 311, identification information capable of uniquely identifying each examinee is registered in the database. In the examinee number 312, an examinee number previously issued from an external apparatus to the examinee is registered. The examinee number is set by the examinee by inputting correctly the number to the reception terminal 400. In the name 313, a name registered in advance so as to be referred to by the examinee number 312 is registered.

In the reception image 314, photographed image data of the examinee photographed by the reception terminal 400 in the reception procedure is registered. For example, this image may include only a single face image or a plurality of images of a face photographed various angles and an image of a whole body and/or the like.

In the reception date/time 315, the time when the examinee has completed the reception processing at the reception terminal 400 is automatically registered. In the examination site 316 and the examination time information 317, information registered in advance so as to be referred to by the examinee number 312 is registered.

In the approaching person information 318, information on a person who approached another person in the monitoring area in the examination site is registered. Therefore, there is no registered information before the reception procedure is completed. Details of the approaching person information 318 will be described later using Table 1 etc. The unauthorized contact flag 319 is normally set to 0, but it is set to 1 when an unauthorized contact with another person is detected. Details of setting of the unauthorized contact flag will be described later with reference to FIG. 6.

Figure 3:
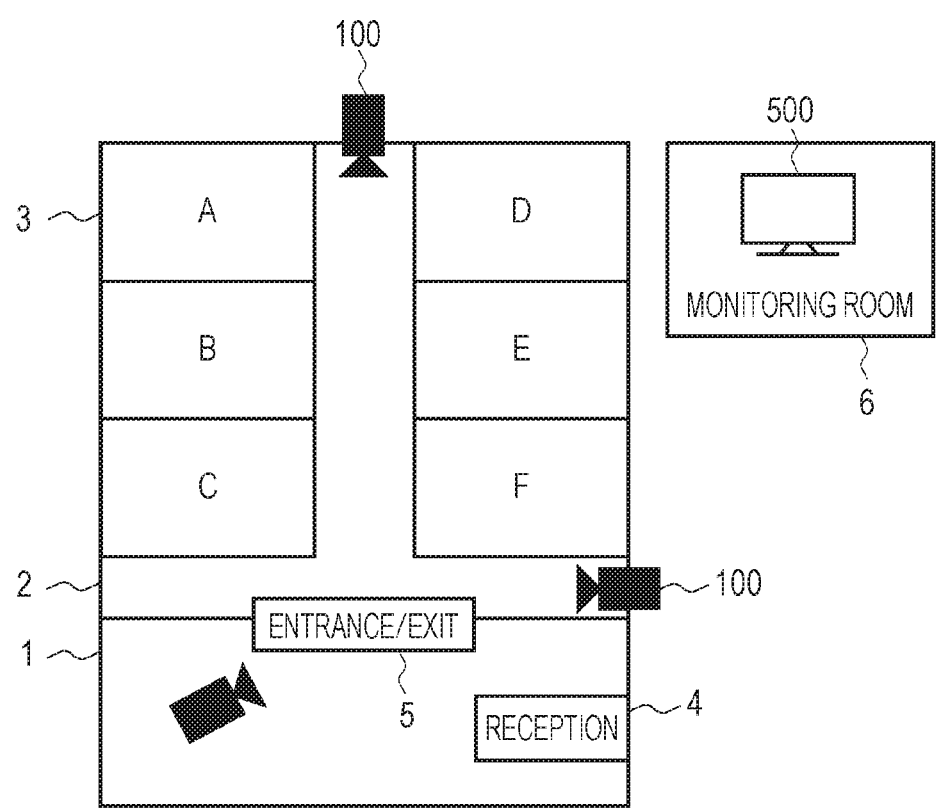
FIG. 3 is a diagram showing an example of a monitoring target area according to an embodiment of the disclosure.

Next, an example of a monitoring area in the monitoring system according to the present embodiment is described below with reference to FIG. 3. An area 1 is located at an entrance of a facility. The area 1 is an area that is not monitored by the monitoring system 10 according to the present embodiment. An area 2 is a monitoring target area (a predetermined area) which is to be monitored by the monitoring system 10 according to the present embodiment. Only examinees are allowed to enter this area 2.

An area 3 includes test rooms A to F which are each an examination site and an area where a predetermined examinee is allowed to enter only during a predetermined period of time.

A monitoring room 6 is provided to monitor the monitoring target areas 2 and 3. Although the area 1 is an area having no direct relation to the present embodiment, the monitoring room 6 may also monitor the area 1. The installation location of the monitoring room 6 depends on an actual situation and does not particularly affect the implementation of the aspect of the embodiments.

When an examinee arrives at the examination site, the examinee goes to a reception desk 4 provided in the area 1. At the reception desk 4, a reception terminal 400 is installed. The examinee inputs his/her examinee number issued in advance at an external apparatus to the examinee, a name, an examination site, and examination time information registered in advance based on the examinee number are displayed on a display apparatus (not shown) on the reception terminal 400.

After the examinee confirms that the information displayed on the display apparatus is correct, an image of the examinee is captured by a camera (not shown) provided on the reception terminal 400, and the reception is completed.

Thereafter, the examinee enters the examination site, that is, the monitoring areas 2 and 3, constructed in a structure allowed to be entered only via the entrance/exit 5. The entrance/exit 5 is provided with a pass gate or the like such that examinees are allowed to pass through only after the reception is completed.

One or a plurality of network cameras 100 are installed in the monitoring area 2 to monitor behaviors of the examinees in the monitoring area 2. The network camera 100 captures an image of examinees in the monitoring area 2, and the information processing apparatus 200 can detect a contact between examinees based on the captured image.

When an unauthorized contact between examinees in the monitoring area 2 is detected, person information about these examinees is sent to a security guard via the information display apparatus 500 in the monitoring room 6.

Figure 4A:
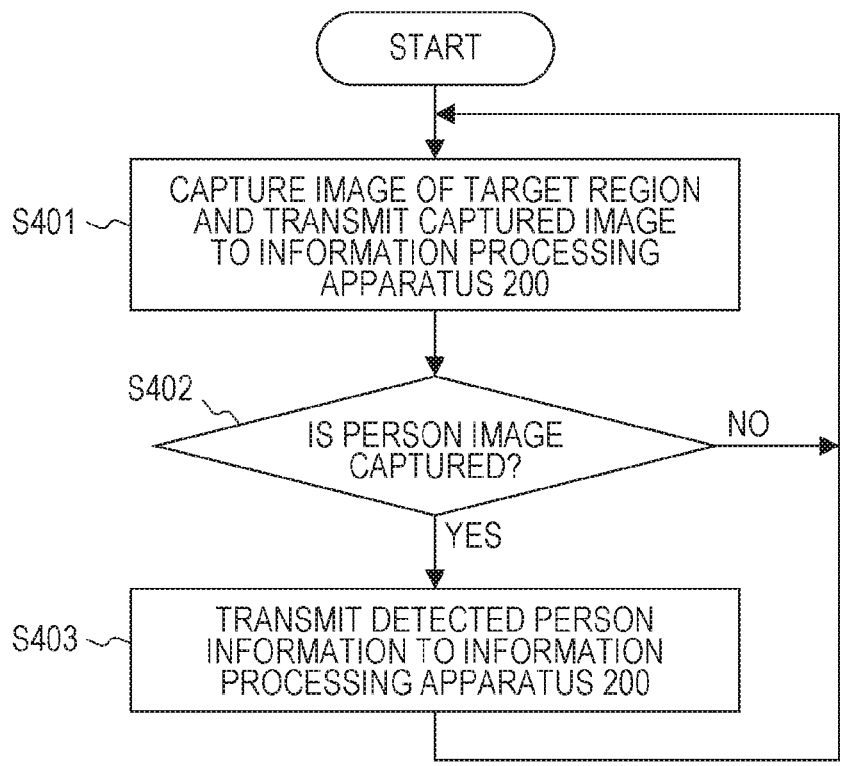
FIG. 4A is a flowchart illustrating an example of a process executed by a network camera in a monitoring system according to an embodiment of the disclosure.

Next, details of the operation of the monitoring system 10 according to the present embodiment are described below. FIG. 4A is a flowchart illustrating an example of a process executed by the network camera 100 in the monitoring system 10 according to the embodiment of the disclosure.

First, in S401, the image sensor unit 101 of the network camera 100 captures an image of a space or an area specified as an imaging target for the installation location of the network camera 100, and the network camera 100 outputs a digital image signal to the development process unit 102. The development process unit 102 performs a predetermined development process on the digital image signal, and then outputs the resultant digital image signal to the coding unit 103 and the person detection process unit 104. The coding unit 103 performs compression-coding on the input digital image signal thereby generating image data, and transmits the resultant image data to the information processing apparatus 200 via the LAN I/F unit 105.

In a subsequent process in S402, the person detection process unit 104 performs a person detection process based on the digital image signal to be processed (hereinafter, simply referred to as a target image). In the present example described here, it is assumed by way of example that the person detection process unit 104 detects a person by detecting a person's face. To detect a face, a known method can be used. If a face of a person is detected, then the process proceeds to S403. However, if a face of a person is no detected, the process returns to S401.

Figure 4B:
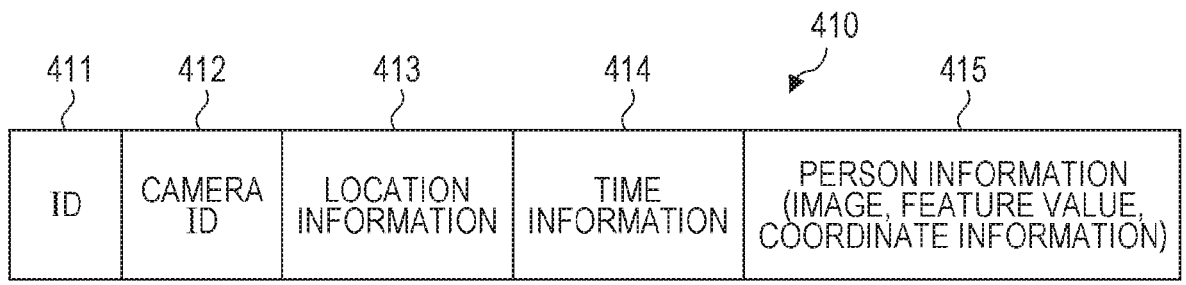
FIG. 4B is a diagram illustrating an example of a data structure of detected person information.

In S403, the person detection process unit 104 transmits information on the detected person (detected person information) to the information processing apparatus 200 via the LAN I/F unit 105. FIG. 4B shows an example of a data structure of the detected person information.

The detected person information 410 includes the ID 411 which is identification information for identifying the information, the camera ID 412 for identifying the network camera 100 that has detected the image, the location information 413 indicating the location of the network camera 100, and the time information 414 indicating the time of shooting. In addition, the detected person information 410 includes person information 415 indicating the detected face image or a specific feature value extracted from the face image and coordinate information indicating a location of the person in the image. In a case where the person information 415 includes image data, the image data may be compression-coded into a still image in the JPEG format or the like. In a case where a plurality of persons are detected in one captured image, the detected person information 410 may be generated such that one piece of detected person information is generated for each person or such that one piece of detected person information includes all detected persons. The detected person information 410 includes coordinate information for identifying the location of each person.

Thereafter, the process returns to S401 to repeat the processing. Via the above processing, the network camera 100 transmits the image data of the area to be imaged to the information processing apparatus 200. Via the above processing, the network camera 100 transmits the image data of the area to be imaged to the information processing apparatus 200.

In the case where the person detection process unit 104 is included in the information processing apparatus 200, the processes in S402 and S403 are not executed by the network camera 100, but are executed by the information processing apparatus 200. More specifically, the person detection process unit 104 performs a person detection process corresponding to the process in S402 on the image data decoded by the decoding unit 202. If a person is detected, the detected person information is provided to the authentication unit 203.

Next, a process executed by the information processing apparatus 200 based on the detected person information 410 received from the network camera 100 is described below with reference to FIG. 5. FIG. 5 is a flowchart illustrating an example of an unauthorized contact detection process executed by the information processing apparatus 200 in the monitoring system 10 according to the embodiment of the disclosure.

In the following description, it is assumed by way of example that the person detection process is performed by the network camera 100. However, the person detection process may be performed by the information processing apparatus 200. In this case, the detected person information 410 is provided by the person detection process unit 104 disposed in the information processing apparatus 200.

First, in S501, the information processing apparatus 200 acquires a captured image and detected person information 410 from the network camera 100.

In S502, the authentication unit 203 performs a person authentication process. More specifically, the person information 415 included in the acquired detected person information 410 is compared with each piece of examinee information in the examinee information database 310, and the most similar examinee information is detected. For example, when the person information 415 includes a face image, face image information (a reception image 314) most similar to the face image is detected from the examinee information database 310.

In S502, feature information in terms of clothes, belongings, ornaments, and/or the like of the person obtained from the image may be used supplementarily. The method of image comparison process for detecting a person is not a feature of the aspect of the embodiments, and any known method can be used, and thus further detailed description thereof will be omitted.

In S503, the determination unit 205 makes comparisons of the location information 413, the time information 414, and the coordinate information included in the person information 415 between the plurality of pieces of detected person information 410. In a case where the comparison result indicates that the difference of each piece of information is within a predetermined threshold value, it is determined that persons of interest are at the same location at the same time. Thereafter, the determination unit 205 acquires, from the examinee information database 310 in the database apparatus 300, the examinee information of all the persons who are determined as being at the same location at the same time (that is, all persons who have a contact).

The process in S503 is an example of a process performed by the acquisition unit according to the aspect of the embodiments, which is configured to acquire location information of the person and information indicating a destination of the person in the predetermined area for a plurality of persons existing in the predetermined area.

In S504, the determination unit 205 determines whether there are a plurality of persons at the same location at the same time based on the information acquired in S503. In a case where it is determined that a plurality of persons are at the same location at the same time, the process proceeds to S505. On the other hand, if it is not determined that a plurality of persons are at the same location at the same time, the process returns to S501 to acquire a next captured image and detected person information.

The process in S504 is an example of a process performed by a determination unit configured to determine, based on the location information, whether a contact has occurred between the persons.

In S505, the determination unit 205 calculates the contact time between a plurality of persons. Thereafter, the determination unit 205 controls the database device 300 such that the result of the calculation is described in the approaching person information 318 and the unauthorized contact flag 319 related to the corresponding person in the examinee information database 310 stored in the database apparatus 300.

Details of the calculation of the contact time and the database update process in S505 will be described later with reference to FIG. 6.

In S506, the determination unit 205 determines whether there is an unauthorized contact. In a case where it is determined by the determination unit 205 that there is a person for whom the unauthorized contact flag 319 has been set as a result of the process in S505, the process proceeds to S507. In a case where there is no person for whom the unauthorized contact flag 319 is set, the process returns to S501 to acquire a next captured image and detected person information.

Note that the process in S506 and processes in S603, S604, and S606, which will be described later, are examples of processes realized by determination unit configured to determine whether the contact is an unauthorized contact based on the information indicating the destination of each of the persons identified as having had the contact by the identifying unit.

In S507, the determination unit 205 sends, to the notification unit 206, the information indicating that the unauthorized contact has occurred to allow a next process to be executed. Thereafter, the process returns to S501 to perform the process on a next captured image.

Note that the process in S507 is an example of a process realized by an output unit configured to output a determination result by the determination unit according to the aspect of the embodiments.

Next, a contact time calculation process and an examinee information database update process are described below with reference to FIG. 6.

Figure 6:
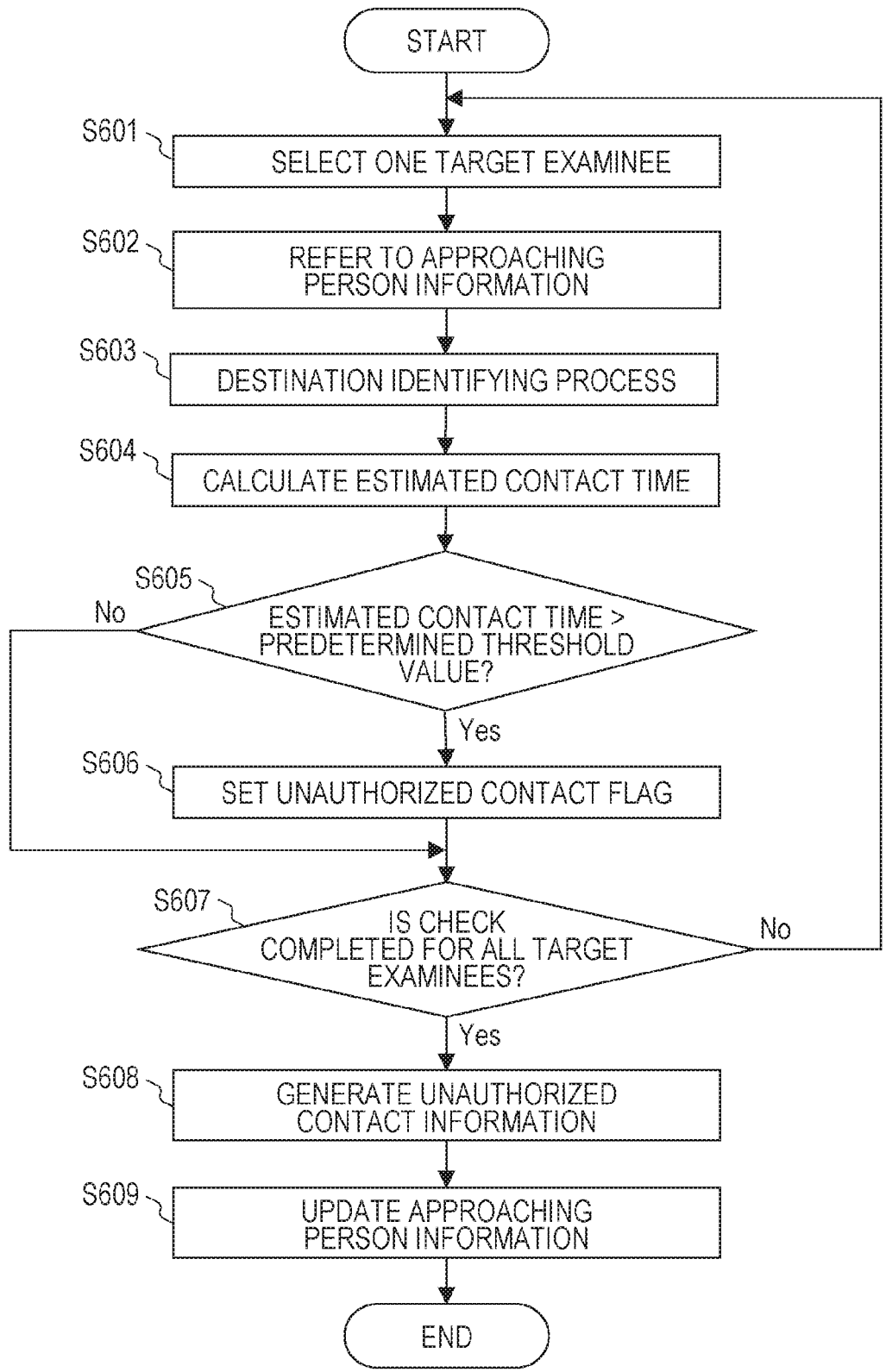
FIG. 6 is a flowchart illustrating an example of a person contact time calculation process executed by an information processing apparatus in a monitoring system according to an embodiment of the disclosure.

FIG. 6 is a flowchart illustrating an example of the contact time calculation process and the examinee information database update process in S505.

First, in S601, the determination unit 205 selects one person (hereinafter, also referred to as a target person) to be subjected to the process in FIG. 6 from among examinees included in the examinee information database 310.

In S602, the determination unit 205 refers to the approaching person information 318 of the data corresponding to the person selected in S601 from the examinee information database 310 stored in the database apparatus 300.

An example of the approaching person information 318 is shown in Table 1. Each time a certain person A is subjected to the authentication in S502 and the process in S503 is executed, approaching information indicating which person the person approached.

That is, when the determination unit 205 executes the process in S503, the person A and the person estimated to be at the same location at the same time are recorded in the approach information as the person who approached the person A.

In Table 1, each vertical column of "authentication timing for person A" indicates one execution of authentication. Table 1 shows that person A has been subjected to a total of five executions of authentication. In these five executions, person B approached person A four times, person C approached person A once, and person D approached person A twice.

TABLE 1

| | | Timing of Authentication of Person A | | | | Estimated Contact Time (min:sec) |
|---|---|---|---|---|---|---|
| Approaching Person | B | ✓ | ✓ | ✓ | ✓ | 2:15 |
| | C | ✓ | | | | 0:10 |
| | D | | | ✓ | ✓ | 0:30 |

In S603, the determination unit 205 determines whether the examination site 316 (the destination) is the same for the target person and another person approaching the target person.

The process in S603 is a process for preventing the unauthorized contact flag 319 from being set, in S606 described later, for the target person and an approaching person in the case the examination site 316 is the same for the target person and the approaching person. That is, in a case where the examination site 316 is the same for the target person and another person, it is inevitable that a contact occurs between these two persons. Besides, in this case, the risk of leakage of an examination problem via this contact is extremely low.

In S604, based on the approaching person information 318, the determination unit 205 calculates a cumulative value of the estimated contact time from the approaching information related to the target person indicating the contact time with another person. The calculated value is referred to as an estimated contact time. The calculated value of the estimated contact time may be recorded in the approaching person information 318 in the database as shown in Table 1.

In S605, the determination unit 205 determines whether the calculated estimated contact time is longer than a predetermined threshold value (a predetermined time) for the target person and each of the other persons approaching the target person. If the calculated estimated contact time is longer than the predetermined threshold value, the process proceeds to S606, but otherwise, the process proceeds to S607.

In S606, the determination unit 205 sets a flag indicating unauthorized contact for a person whose estimated contact time with the target person is longer than the predetermined threshold. More specifically, the unauthorized contact flag 319 corresponding to the target person in the examinee information database 310 is set to 1. However, even if the estimated contact time with the target person is longer than the predetermined threshold value, the determination unit 205 does not set the unauthorized contact flag 319 for a person whose examination site 316 (the destination) is the same as that of the target person.

In another embodiment, in a case where the examination site 316 is the same for the target person and another different person but the examination start time is different for these persons, if a contact occurs between these persons, the unauthorized contact flag 319 may be set to 1. This makes it possible to prevent an examinee who has finished the examination from leaking examination contents to a next examinee.

In S607, the determination unit 205 determines whether the process up to S606 has been performed for all the authenticated persons. In a case where the process has been performed for all persons, the process proceeds to S608, but otherwise, the process returns to S601 to perform the process on a next person.

In S608, the determination unit 205 checks the approaching person information 318 of all persons each taken as a target person, and generates unauthorized contact information indicating a combination of persons regarded as having had a contact for time, indicated by the estimated contact time, longer than the predetermined threshold value. Note that the generation of the unauthorized contact information in this process is not essential.

In S609, the determination unit 205 updates the approaching person information 318 in the examinee information database 310 corresponding to the target person subjected to the process in S601 based on the processing results in S602 to S606. The approaching person information 318 is updated for a person who has had a contact by this point of time. For a person who has not had a contact, the approaching person information 318 is updated by adding information indicating no contact.

Note that, in the present embodiment, the process in S604 and S605 by the determination unit 205 is not essential. The process in S606 may be executed simply in a case where there is a person who has had a contact, regardless of the contact time. However, by executing the processing of S604 and S605, it is possible to reduce the possibility of being determined as contact when a plurality of persons simply pass each other.

In the above description of the present embodiment, it is assumed by way of example that the information processing apparatus 200 executes the processing shown in FIGS. 5 and 6. However, in an alternative embodiment, part or all of the process shown in FIGS. 5 and 6 may be executed by the network camera 100.

Next, an explanation is given as to a process of displaying information about a person who has made an unauthorized contact on the information display apparatus 500 based on the above processing result. FIG. 7 is a flowchart illustrating an example of the process executed by the information processing apparatus 200 in the monitoring system 10 according to an embodiment of the disclosure.

The process shown in FIG. 7 may be started in response to a request from the information display apparatus 500, or may be started at a predetermined timing (for example, every one minute). Alternatively, in S507, the process may be started at the timing when the determination unit 205 notifies the notification unit 206 of information indicating that an unauthorized contact has occurred.

First, in S701, the notification unit 206 of the information processing apparatus 200 searches the examinee information database 310 for a person for whom the unauthorized contact flag 319 is set to 1. A security guard can identify a person based on his/her ID 311, examinee number 312, name 313, etc. Therefore, the notification unit 206 acquires these pieces of information on the person from the examinee information database 310 via the database management unit 204.

In S702, the notification unit 206 acquires, from the examinee information database 310 via the database management unit 204, the reception image 314 of the person or the feature value calculated from the reception image 314 for the person identified via the processing in S701. The feature value may be calculated at the timing when the reception image 314 is captured and stored in the examinee information database 310, or may be calculated from the reception image 314 as needed.

In S703, the notification unit 206 searches the captured image data received from the network cameras 100 installed in the monitoring areas 2 and 3 to detect a person with the unauthorized contact flag set. More specifically, for example, the person information 415 included in the detected person information 410 received from the network camera 100 is compared with the feature value acquired in S702. Thus, it is possible to identify the captured image data of the person for whom the unauthorized contact flag is set and the location thereof.

In S704, the notification unit 206 converts the information in the examinee information database 310 into information that can be displayed in a form in which it is superimposed on the captured image data of the monitoring areas 2 and 3 at the location identified in S703. The information in the examinee information database 310 includes the ID 311, the name 313, the examinee number 312, and the like of the person for whom the unauthorized contact flag 319 is set to 1.

In a case where the person image 801 is superimposed on a floor plan of the facility used as the examination site on the display screen described later in FIG. 8A or 8B, in S704, the notification unit 206 converts the information in the examinee information database 310 into information that can be superimposed on the floor plan.

In S705, the notification unit 206 transmits the above-described superimposable information together with the captured image data identified in S703 to the information display apparatus 500. When the information display apparatus 500 receives this information, the information display apparatus 500 is capable of displaying, on its screen, the information about the person (the examinee) for which the unauthorized contact flag is set in the captured image data transmitted from the notification unit 206 of the information processing apparatus 200 in a manner that allows it to identify the person.

In the above description of the process in FIG. 7, it is assumed by way of example that the process is performed by the information processing apparatus 200. However, alternatively, the process in FIG. 7 may be performed by the network camera 100.

FIGS. 8A and 8B each are a diagram illustrating an example of a screen displayed on the information display apparatus 500 according to an information transmitted in S705 from the notification unit 206 of the information processing apparatus 200 to the information display apparatus 500.

FIG. 8A is an example of a screen displayed in a normal state in which there is no examinee making an unauthorized contact.

On the screen 800, information on persons present in the monitoring areas 2 and 3 is displayed such that the information is superimposed on the floor plan of the facility used as the examination site. The positions of superimposing the person information are determined based on the detected person information 410.

A person image 801 may be an icon representing a person or a reception image 314 acquired at the time of reception. As for examinees present in each of the test rooms A to F located in the monitoring area 2, they are monitored in the each room. Therefore, the information about them may be displayed in a manner in which information about persons present in the monitoring area 2 is displayed. For example, the color of the icon may be reduced as is performed for a person image 802.

A person information display 803 indicates information on persons present in the monitoring areas 2 and 3. The person information display 803 includes at least one of the ID 311, the examinee number 312, the name 313, the reception image 314, the reception date/time 315, the examination site 316, and the examination time information 317 recorded in the examinee information database 310. Alternatively, the person information may be displayed such that a small number of pieces of information such as the ID or the like are displayed in a normal state, but detailed information is additionally displayed when a predetermined specific operation such as clicking on an icon is performed.

FIG. 8B shows an example of a screen displayed on the information display apparatus 500 according to an information which is transmitted in S705 from the notification unit 206 of the information processing apparatus 200 to the information display apparatus 500 in a situation in which an examinee making an unauthorized contact is detected.

In a case where a person with an ID of 001 and a person with an ID of 011 having different destinations make an unauthorized contact as in the example, a highlighted sign 804 is displayed to call attention to a security guard who monitors the screen. In this example, the highlighted sign is displayed so as to surround a location of persons making the unauthorized contact. However, the manner of calling attention to the security guard is not limited to this example, and any other proper method may be used. For example, a color or a shape of the person image 801 may be changed, or text information may be displayed in a screen area (not shown), or a sound warning may be generated using a speaker (not shown).

Next, a description is given below as to another example in which a screen is displayed on the information display apparatus 500 according to an information transmitted in S705 from the notification unit 206 of the information processing apparatus 200 to the information display apparatus 500.

In the example described above with reference to FIGS. 8A and 8B, information on the location of persons making an unauthorized contact is superimposed on the floor plan. On the other hand, in the present example, information about a person (an examinee) who is identified in S703 based on the captured image data received from the notification unit 206 of the information processing apparatus 200 and for whom the unauthorized contact flag is set is superimposed at a location of the person. Note that the information on the person for whom the unauthorized contact flag is set is the same information as the information displayed on the person information display 803.

Displaying the captured image data makes it easier for the security guard to grasp the actual situation of the site than displaying a floor plan. This further makes it possible for the security guard to correctly determine whether or not the contact is an unauthorized contact, and to appropriately deal with the person who made the unauthorized contact.

In an alternative embodiment, only the information about the person may be displayed on the screen without superimposing the information on the person at the location of the person for which the unauthorized contact flag 319 is set. In this case, in addition to the information displayed on the person information display 803, the reception image 314 of the person (the examinee) is displayed for which the unauthorized contact flag is set. Displaying the reception image 314 makes it possible for the security guard to grasp the face of the person for whom the unauthorized contact flag is set, and thus it becomes easier to find the person in the examination site 316.

In the above description, the embodiment has been explained by way of example for a case in which a person is identified based on an image captured by the network camera 100. However, the method of identifying a person is not limited to the above example in which only an image is used. For example, a beacon transmitter may be given to each person (examinee) when the person checks in at the reception desk 4. By receiving a beacon signal transmitted from the beacon transmitter, the location coordinates of each person may be detected, and an unauthorized contact may be detected based on whether the position coordinates of a plurality of persons overlap. However, in the case of using a beacon transmitter, there is a possibility that the location coordinates are slightly different from correct values, and use of the captured image data can result in more accurate detection of an unauthorized contact.

According to the embodiment described above, it is possible to detect a contact between examinees who should not be in contact with each other at an examination site or the like and issue a notification thereof. Thus, it is possible to provide a mechanism for preventing examinees or the like, in an monitoring area, from contacting each other and transferring information, and more specifically, preventing leakage of examination issues.

Second Embodiment

In the first embodiment described above, a technique has been explained for a case where an unauthorized contact between examinees in an examination site is detected. It is usual that examinees at an examination site have no accompanying person. A second embodiment described below discloses a method of detecting a contact in a situation in which a person with an accompanying person visits a facility and tries a contact with another group. A further description of contents common to the first embodiment is omitted.

In the second embodiment, a technique of monitoring a person is explained by way of example for a case where the person visits an inpatient in a hospital requiring high security.

When a visitor arrives at a hospital, the visitor inputs a visit destination, a visit time, and his/her own name at a reception terminal 400 installed in a reception desk 4, and furthermore takes an image of himself/herself according to an instruction given by the reception terminal 400. In a case where there is an accompanying person who has already checked in, it is allowed to input information about the accompanying person by specifying an ID of the accompanying person. Note that the above-described operations at the reception desk 4 may be performed, for example, by a hospital staff operating the reception terminal 400 at the reception desk 4.

FIG. 9 shows an example of a visitor information database 320 built in the database apparatus 300 in which information acquired at the reception is recorded. An ID 321, a visit destination 322 represented by a name of an inpatient, and a visitor name 323 are input as visitor information at the reception terminal 400 and the input visitor information is registered in the visitor information database 320. In addition, a reception image 324 acquired via the image capturing by the reception terminal 400, a reception date/time 325, a visit time 326, and a companion ID 327 are registered. Furthermore, approaching person information 328 and an unauthorized contact flag 329 are also recorded monitoring information for each visitor. Among the above items of information, the companion ID 327 characterizes the feature of the present embodiment, and thus the companion ID 327 is described below and a description of other items is omitted.

In the example shown in FIG. 9, the visitor information database 320 indicates that three persons with IDs 0001, 0002, and 0004 are companions and they are to visit the same destination. The reception date/time 325 indicates that two persons with ID0001 and ID0002 completed check-in before the other person and thus these two persons were likely to have waited for the check-in for the person with ID0004 to be completed. The person with ID 0004 acquires in advance the IDs of the two persons and inputs these IDs at the reception terminal 400 via the reception procedure. As a result, companion information is added to the companion ID corresponding to ID0001, ID0002, and ID0004 in the visitor information database. In a case where security is further important, all companions may perform the check-in operation at the same time, or a group photograph may be taken when the check-in operation is performed for a final person of the group thereby making it possible to reduce the risk that an unrelated person impersonates as a companion.

The subsequent part of the unauthorized contact detection process is the same as in the first embodiment. However, an additional process of referring to a companion ID is performed before the process of setting the unauthorized contact flag in S606. In this additional process, in a case where a contact is performed among the companions, the unauthorized contact flag is not set even when the estimated contact time with a target person is longer than a predetermined threshold value. This makes it possible to prevent a contact made by a companion from being erroneously detected as an unauthorized contact.

In the present embodiment, a method has been disclosed in which an erroneous detection of an unauthorized contact is prevented by providing information on a companion to the system in the reception procedure. In addition, it is also possible to provide a mechanism in which a contact is excluded from being monitored under particular conditions defined in advance depending on the structure or the state of the monitoring target facility. For example, when persons visit the same visit destination at a predetermined date/time, contacts among these visitors may be excluded from being monitored. This prevents an unnecessary detection and a notification from being performed in a situation in which many people participate in an event held in a corner of a facility.

According to the above embodiment, it is possible to detect a contact among unrelated visitors in a facility such as a hospital where strict security management is required. Thus it is possible to provide a mechanism for preventing unauthorized transferring of information or articles from being performed in a facility, and for suppressing unnecessary troubles between visitors.

Other Embodiments

The embodiments have been described in detail above. The aspect of the embodiments can be practiced in the forms of, for example, a system, an apparatus, a method, a program, and a recording medium (storage medium). More specifically, for example, the aspect of the embodiments may be applied to a system including a plurality of devices (for example, a host computer, an interface device, an image capture apparatus, a Web application, etc.), or may be applied to an apparatus including a single device.

Furthermore, the aspect of the embodiments can also be realized by the following processing. A program to realize one or more functions of the above-described embodiments is supplied to a system or apparatus via a network or a storage medium. One or more processors in a computer of the system or apparatus read and execute the program. The aspect of the embodiments may also be implemented by a circuit (for example, ASIC) that realizes one or more functions.

According to one of embodiment described above, it is possible to provide a technique of detecting a contact between persons who should not be in contact with each other in a particular area and e like and outputting a detection result.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2019-067474, filed Mar. 29, 2019, and No. 2019-229715, filed Dec. 19, 2019 which are hereby incorporated by reference here in their entirety.

What is claimed is:

1. An apparatus configured to monitor a person in a predetermined area, comprising:
    an acquisition unit configured to acquire information indicating a location of the person and information indicating a destination of the person in the predetermined area, the acquisition being performed for each of a plurality of persons present in the predetermined area;
    a determination unit configured to determine whether a contact between persons having different destinations has occurred based on the acquired information; and
    an output unit configured to, in a case where the contact has occurred, output information identifiably indicating the occurrence of the contact.

2. The apparatus according to claim 1, wherein in a case where a difference between information indicating locations of persons is within a predetermined range, the determination unit determines that a contact occurs.

3. The apparatus according to claim 2, wherein in a case where a difference between information indicating locations of persons is within a predetermined range and the difference within the predetermined range is kept for a period of time longer or equal to a predetermined value, the determination unit determines that a contact occurs.

4. The apparatus according to claim 1, wherein the output unit outputs a screen using information about the person so as to identifiably indicate the person who has made the contact.

5. The apparatus according to claim 1, wherein the acquisition unit acquires information indicating the location of the person from image data captured by an image capturing apparatus.

6. The apparatus according to claim 1, wherein in a case where the predetermined area is a predetermined facility, and the information indicating the destination is information indicating a room of the predetermined facility.

7. The apparatus according to claim 1, wherein in a case where a contact occurs between persons having a same destination, the output unit does not output the information.

8. The apparatus according to claim 1, wherein the acquisition unit is configured to acquire information indicating a destination of a person, the destination being located in the predetermined area and being registered when the person performs a reception procedure using a reception apparatus installed in the predetermined area.

9. The apparatus according to claim 8, wherein the determination unit performs the determination on a person who has performed the reception procedure using the reception apparatus.

10. An apparatus configured to monitor a person in a predetermined area, comprising:
an acquisition unit configured to acquire information indicating a location of the person and information indicating a destination of the person in the predetermined area, the acquisition being performed for each of a plurality of persons present in the predetermined area; and
an output unit configured to output predetermined information in a case where a difference in information indicating a location of a person is smaller than or equal to a threshold value between a plurality of persons each having different acquired information indicating the destination.

11. The apparatus according to claim 10, wherein the output unit does not output the predetermined information in a case where the difference between information indicating the locations of the plurality of persons is greater than or equal to the threshold value or in a case where each person of the plurality of persons has different information indicating the destination of the person.

12. The apparatus according to claim 10, wherein the output unit outputs, as the predetermined information, information identifiably indicating that a contact has occurred between persons each having a different destination.

13. The apparatus according to claim 10, wherein in a case where the predetermined area is a predetermined facility, and the information indicating the destination is information indicating a room of the predetermined facility.

14. A method comprising:
acquiring information indicating a location of a person and information indicating a destination of the person in a predetermined area, the acquisition being performed for each of a plurality of persons present in the predetermined area;
determining whether a contact between persons having different destinations has occurred based on the acquired information; and
in a case where the contact has occurred, outputting information identifiably indicating the occurrence of the contact.

15. A method comprising:
acquiring information indicating a location of a person and information indicating a destination of the person in a predetermined area, the acquisition being performed for each of a plurality of persons present in the predetermined area; and
outputting predetermined information in a case where a difference in information indicating a location of a person is smaller than or equal to a threshold value between a plurality of persons each having different information indicating the acquired destination.

16. A non-transitory storage medium storing a program causing a computer to function as:
an acquisition unit configured to acquire information indicating a location of a person and information indicating a destination of the person in a predetermined area, the acquisition being performed for each of a plurality of persons present in the predetermined area;
a determination unit configured to determine whether a contact between persons having different destinations has occurred based on the acquired information; and
an output unit configured to, in a case where the contact has occurred, output information identifiably indicating the occurrence of the contact.

17. A non-transitory storage medium storing a program causing a computer to function as:
an acquisition unit configured to acquire information indicating a location of a person and information indicating a destination of the person in a predetermined area, the acquisition being performed for each of a plurality of persons present in the predetermined area; and
an output unit configured to output predetermined information in a case where a difference in information indicating a location of a person is smaller than or equal to a threshold value between a plurality of persons each having different information indicating the acquired destination.

* * * * *